Figure 1:
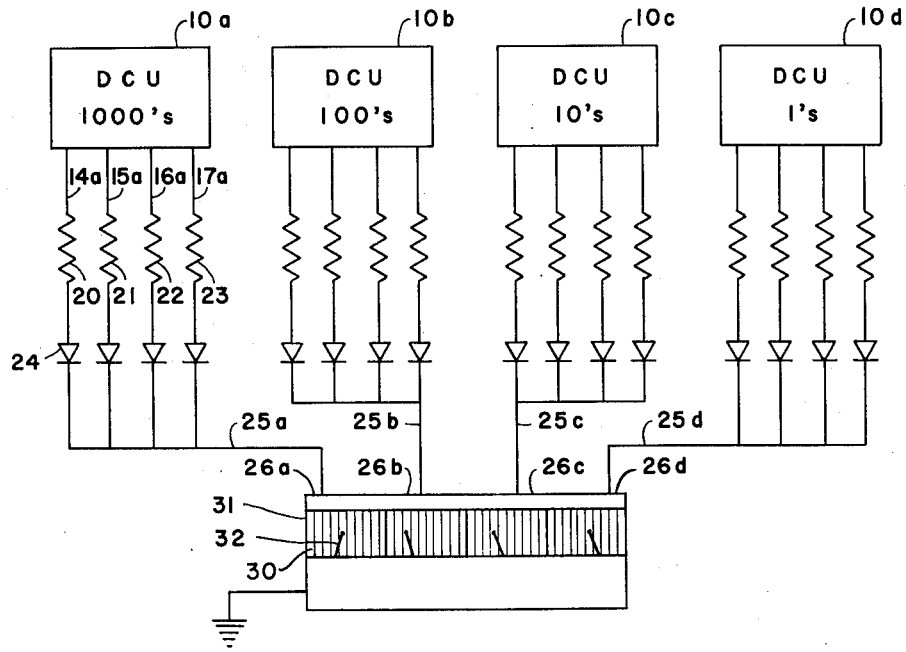

Oct. 16, 1962 R. H. KOLB 3,059,237
CHART RECORDER
Filed May 11, 1959

INVENTOR:
ROBERT H. KOLB
BY *Theodore E. Bieber*
HIS ATTORNEY

United States Patent Office 3,059,237
Patented Oct. 16, 1962

3,059,237
CHART RECORDER
Robert H. Kolb, Houston, Tex., assignor to Shell Oil Company, New York, N.Y., a corporation of Delaware
Filed May 11, 1959, Ser. No. 812,164
1 Claim. (Cl. 346—14)

This invention pertains to recorders and more particularly to a recorder which is designed to record on a chart record the number of pulses counted by a digital counter.

In portable instruments, particularly test instruments used in the oil fields, data is often recorded by a digital counter which counts a number of pulses corresponding to the magnitude of the data being recorded. The pulses are generated by a known frequency oscillator which is gated by the condition under test. An example of such an oil field instrument is the downhole pressure recording device disclosed in the applicant's copending application Serial No. 731,328, filed April 28, 1958. In the applicant's prior application the downhole pressure is converted into an oscillating signal whose frequency varies inversely with the downhole pressure. The surface instrument detects this oscillating signal and records the number of pulses from a known frequency source which occur during a time period determined by the frequency of the oscillating signal. The final count on the digital counter is read out by an adding machine type of printer on a paper tape to be inspected at a later date. This is necessary since such downhole pressure recorders are usually installed and allowed to run unattended for a considerable length of time to conduct a reservoir survey. While this is one type of data which must be recorded, much other data are similarly recorded, for example, downhole temperature, information obtained during the logging of wells, and similar information.

Since the above data is obtained in oil fields which many times are situated at remote locations, it is difficult to obtain suitable commercial power supplies for operating the equipment. In addition, unattended operation requires that the instrument be of rugged construction and contain as few parts as possible. Thus, it is necessary that the equipment be capable of operating off of portable power supplies, such as batteries or the like for long periods of time unattended.

The previously used adding machine type printer while having relatively low power requirements required a complicated read-out matrix for converting the digital counter output signal to suitable signals for operating the printer. In addition to its complication the read-out matrix required a large number of vacuum tubes and relays which require constant attention in order to function properly. Of course, the combination of the read-out matrix and printer are expensive, thus decreasing the usefulness of a recording device that incorporates them.

Accordingly, the principal object of this invention is to provide a novel recording device which requires no read-out matrix to operate and is capable of maintaining the accuracy of the digital counter while providing a permanent record.

A more particular object of this invention is to provide a recording device which will record the total pulses counted by a digital counter on a chart recorder while at the same time maintaining the digital counter accuracy.

A further object of this invention is to provide a means for recording digital information in a manner which presents both the variations in the information with respect to a chosen base and the instantaneous digital value of the information.

The above objects of this invention are obtained by utilizing a recording galvanometer type instrument to record the total pulses counted by each decade of the digital counter. The movement of the galvanometer is divided into ten discrete steps in order that each digit may be assigned a particular discrete position in the galvanometer range. The output of each decade of the digital counter is converted to a single current whose magnitude corresponds to the digit and in addition positions the galvanometer in the proper one of the ten discrete positions or steps. A separate circuit and recording galvanometer is provided for each decade of the digital counter although all of the galvanometers may be adapted to record on a single strip chart to provide a single composite record. From the single record it is easy to ascertain any trend in the data being recorded as well as the exact data recorded from the digital counter at any particular moment.

Figure 2:
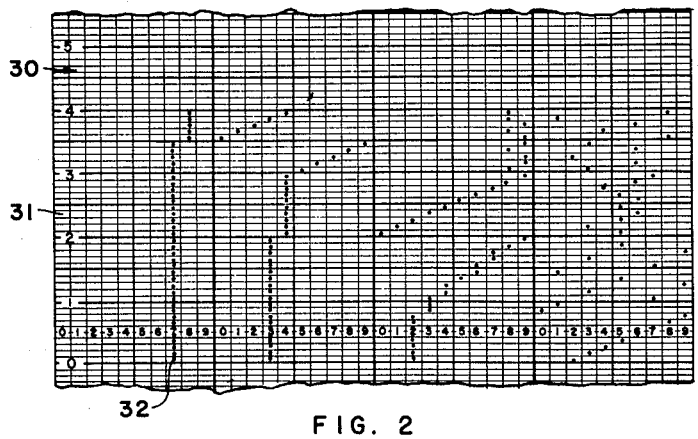

The above objects and advantages of this invention will be more easily understood by those skilled in the art from the following detailed description when taken in conjunction with the attached drawing in which:

FIGURE 1 is a schematic diagram showing the application of this invention to a digital counter having four decades; and, FIGURE 2 is an enlarged view of the portion of the strip chart of the galvanometers shown in FIGURE 1.

Referring now to FIGURE 1, there is shown four decades 10a, 10b, 10c and 10d of a digital counter which record the thousand, the hundred, the ten, and the unit digits, respectively. While a four decade digital counter is shown, the invention could be easily applied to any number of decades simply by increasing the circuits and number of recording galvanometers. The output current of each binary of a decade as shown by the leads 14a, 15a, 16a and 17a for the thousand decade 10a is weighted so that if the individual currents of these four leads are added the final current will be proportional to the digit or number accumulated on the decade. In one particular example, the lead 14a corresponds to the digit 1, lead 15a corresponds to the digit 2, lead 16a corresponds to the digit 4, and the lead 17a corresponds to the digit 8. More particularly, the counter disclosed in the applicant's copending application is the type where each of the leads is either on or off and when on a positive voltage of some predetermined value appears and when off no voltage appears. Of course, other systems for digital counting utilizing different binary codes and voltage signals could also be used.

The output leads of each decade are connected to suitable resistances such as 20, 21, 22 and 23 for the decade 10a. The values of the resistance are chosen so that when the positive voltage from the digital counter flows through the resistance the current flow will be weighted for the particular digit corresponding to the lead from the digital counter which is energized. Thus, for example, the resistance 20 should have a value such that when the voltage from the digital counter flows through it the current flow will be 0.1 milliampere. Of course, any other current flow corresponding to the digit 1 could also be chosen. The remaining resistances 21, 22 and 23 are similarly chosen to obtain the desired current flow. Thus, in the particular example described the current flow through the resistance 21 should be 0.2 ma., the resistance 22 should be 0.4 ma. and the current flow through 23 should be 0.8 ma. A semi-conductor type diode 24 is disposed in the connection between each of the resistances and the lead 25a in order to prevent the flow of current through one resistance and then back to ground through an unused resistance. In systems in which the values of the resistances 20, 21, 22 and 23 are very high with respect to the internal resistance of the galvanometer the blocking diodes 24 may be omitted. The four leads from the decade 10a are connected in series to the single lead 25a which is connected to a recording galvanometer 26a.

The recording galvanometer 26a is provided with a strip chart record 30 which is divided into ten equal spaces 31 across its width. Furthermore, the galvanometer should be of the type having an arm which moves rectilinearly, that is one in which the transverse movement of the arm is linearly proportional to the current. Thus, if one adjusts the galvanometer so that the movable arm 32 will take a position in the space 31 farthest to the left when no current flows through the lead 25a the galvanometer will record a zero as explained below. When the lead 14a has current flowing through it and the 0.1 ma. flows through the lead 25a the movable arm 32 of the galvanometer should move to the second space 31 from the left to record the digit 1. Similarly, the remaining digits from the decade 10a are recorded in their appropriate spaces on the chart record 30. The remaining decades of the digital counter record on similar galvanometers 26b, 26c and 26d which are positioned so that they are aligned with the galvanometer 26a. Thus all of the galvanometers may record in the same longitudinal position on a single strip chart 30 at any particular time.

The outputs of the remaining decades 10b, 10c and 10d are coupled to resistances and diode circuits similar to that described above for decade 10a. The current signals from the separate resistances of the decade 10b are added and coupled to the galvanometer 26b by a lead 25b. The signal from decade 10c is coupled to a galvanometer 16c by lead 25c while the signal from the decade 10d is coupled to galvanometer 26d by lead 25d. Thus the digit of each decade is converted to the proper current signal to position the arm of an associated galvanometer.

Referring now to FIGURE 2, there is shown a sample strip chart 30 from the galvanometers 26a, 26b, 26c and 26d described above. In this strip chart the first number recorded at the bottom is 7322. It will be noted that the movable arm of each galvanometer was positioned in a discrete space prior to recording and then the recording made by a small dot in the particular space. From an inspection of the strip chart shown in FIGURE 2, one can easily determine any trend or change in the data being recorded by noting the apparent change in the recorded dots. One can also determine the precise number recorded at any particular instant which is an exact duplication of the counts accumulated by the four decades of the digital counter during the immediately previous counting cycle. While any desired means may be used for actually recording on the strip chart 30, the use of a pressure sensitive material is preferred since this will enable one to use a dry process for recording in contrast to the ink type recording of some devices.

The graphic display obtained by the recorder of this invention is an important advantage since it permits one to ascertain any trend or change in the data recorded by visual inspection of the chart record. From an inspection of the chart record shown in FIGURE 2 one can detect a slow increase in the magnitude of the recorded data at the bottom of the chart, this increase becoming greater in the upper portion of the chart. This chart shown in FIGURE 2 traveled in a downward direction when recorded although it could easily have been arranged to travel in the opposite direction. Thus, the chart record is an accurate graphical presentation of the magnitude of the recorded data with respect to time. Even though the recording system provides a graphical record it still maintains the accuracy of the digital counter by recording the exact count accumulated on the counter.

Furthermore, the galvanometer should be of a type which records at a set time interval by pressing the movable arm 32 against the pressure sensitive material of the chart record and then releases the arm so that it is free to assume a new position. It would also be desirable that the timing mechanism which advances the chart record of the recorder at a fixed rate should control the operation of the digital counter as well as the operation of the mechanism which presses the galvanometer needles against the chart to effect the recording. In this way the operation of the devices are synchronized so that the counting and the recording never take place simultaneously. For example, in the applicant's copending application the programmer which initiates the operation of the downhole pressure sensing device and digital counter should be driven by the same mechanism which drives the chart and operates the recording means.

From the above description it can be easily appreciated that this invention has provided a simple and economical recording means for recording the pulses counted by a digital counter. In addition, the device has a relatively low power requirement since the recording galvanometers require approximately 0.1 of a volt to operate and thus the total requirement of each galvanometer is less than a milliwatt of power. This amount of power can easily be supplied by the counter circuits directly without any intervening amplification. Furthermore, the above invention does not require complicated converters or read-out matrixes for converting the binary coded output of the individual decades of the digital counter to a decimal coded input to operate a recorder. The simple resistances perform the conversion so that movable arms of the recording galvanometers are positioned in their discrete positions corresponding to the count accumulated in each decade of the digital counter. This greatly simplifies the recording device thereby considerably reducing its cost and improving its reliability.

While but one particular embodiment has been described in detail, many modifications and improvements will occur to those skilled in the art. Accordingly, this invention should not be limited to the details described but only to its broad spirit and scope.

I claim as my invention:

A strip chart recording mechanism for simultaneously recording both digitally and graphically the number of pulses accumulated on a digital counter comprising: a separate circuit means including a resistance element for converting each binary output of each decade of the counter to a proportional electrical signal; a circuit means for adding the electrical signals of each decade to obtain a single electrical signal; separate meter means for separately recording on a strip chart record the magnitude of the single electrical signal from each decade, all of said meter means being disposed to record in an aligned relationship on a single chart record and said meter means in addition being responsive to the single electrical signal of each decade to record in discrete predetermined positions transverse to the record, said transverse positions being chosen to display the ten units of each decade, said chart record being advanced at a rate related to the base chosen for the information recorded on the digital counters.

References Cited in the file of this patent

UNITED STATES PATENTS

| | | |
|---|---|---|
| 1,952,991 | Kolff | Mar. 27, 1934 |
| 2,705,105 | Paschen | Mar. 29, 1955 |
| 2,718,634 | Hansen | Sept. 20, 1955 |
| 2,803,815 | Wulfsberg | Aug. 20, 1957 |
| 2,816,709 | Barth | Dec. 17, 1957 |
| 2,847,268 | Cowper | Aug. 12, 1958 |
| 2,860,832 | Burns | Nov. 18, 1958 |